US011364889B2

(12) United States Patent
Medveded et al.

(10) Patent No.: US 11,364,889 B2
(45) Date of Patent: Jun. 21, 2022

(54) VEHICULAR HYDRAULIC BRAKE SYSTEM

(71) Applicant: Ovik Leonardovich Mkrthyan, Moscow (RU)

(72) Inventors: Dmitry Vadimovich Medveded, Tashkent (UZ); Ovik Leonardovich Mkrthyan, Moscow (RU); Evgeniy Efimovich Mazo, Tashkent (UZ)

( * ) Notice: Subject to any disclaimer, the term of this patent is extended or adjusted under 35 U.S.C. 154(b) by 266 days.

(21) Appl. No.: 16/345,714

(22) PCT Filed: Jan. 31, 2017

(86) PCT No.: PCT/UZ2017/000001
§ 371 (c)(1),
(2) Date: Apr. 28, 2019

(87) PCT Pub. No.: WO2018/081839
PCT Pub. Date: May 3, 2018

(65) Prior Publication Data
US 2019/0351885 A1  Nov. 21, 2019

(30) Foreign Application Priority Data
Oct. 28, 2016  (UZ) .................. FAB 2016 0125

(51) Int. Cl.
*B60T 13/58*  (2006.01)
*B60T 7/04*  (2006.01)
(Continued)

(52) U.S. Cl.
CPC ............ *B60T 13/58* (2013.01); *B60T 7/04* (2013.01); *B60T 13/145* (2013.01);
(Continued)

(58) Field of Classification Search
CPC ...... B60T 13/58; B60T 13/145; B60T 13/741; B60T 7/04; B60T 2270/402; F16D 65/16; F16D 65/28; F16D 2121/04
See application file for complete search history.

(56) References Cited

U.S. PATENT DOCUMENTS

| 5,887,954 A  * | 3/1999 | Steiner ................. B60T 13/745 303/113.4 |
| 9,145,119 B2 * | 9/2015 | Biller ....................... B60T 13/58 |
| 2017/0361823 A1* | 12/2017 | Kim .......................... B60T 8/34 |

FOREIGN PATENT DOCUMENTS

| DE | 42 29 041 A1 | 3/1993 |
| DE | 43 22 292 A1 | 1/1995 |

(Continued)

OTHER PUBLICATIONS

Examination Report for Australian Patent Application No. 2017347973, dated Mar. 24, 2020.

(Continued)

*Primary Examiner* — Xuan Lan Nguyen
(74) *Attorney, Agent, or Firm* — Raymond Van Dyke; Van Dyke Intellectual Property Law

(57) ABSTRACT

A transportation vehicle with a brake system designed for rapid deceleration of a moving vehicle, which enhances the effectiveness of vehicular braking in emergency situations, and increases the safety of automobile traffic on roads, which results in greater road-traffic safety due to enhanced reliability and higher effectiveness of braking under emergency situations.

A vehicular hydraulic brake system having a master brake cylinder with a hydraulic reservoir supplying a brake fluid, a control foot pedal and a vacuum booster connected to an operating brake cylinder of each wheel. The brake system has emergency braking assemblies mounted before the operating brake cylinders of at least rear wheels. The emergency (Continued)

braking assembly includes an electrical mechanism operating in a reciprocating manner and has a rod attached to a piston of a hydraulic cylinder. An inlet hole of the hydraulic cylinder is connected to a pipeline in communication with the master braking cylinder. An outlet hole of the hydraulic cylinder is in communication with the operating brake cylinder. A top portion of the hydraulic cylinder has a compensation port in close proximity to the electrical mechanism, said compensation port being connected to the pipeline in communication with the master braking cylinder. A bottom portion of the hydraulic cylinder of the emergency braking assembly is disposed not lower than a top level of the operating brake cylinder.

14 Claims, 2 Drawing Sheets

(51) Int. Cl.
| | | |
|---|---|---|
| *B60T 13/14* | (2006.01) | |
| *B60T 13/74* | (2006.01) | |
| *F16D 65/16* | (2006.01) | |
| *F16D 65/28* | (2006.01) | |
| *F16D 121/04* | (2012.01) | |
| *F16D 125/70* | (2012.01) | |

(52) U.S. Cl.
CPC ............ *B60T 13/741* (2013.01); *F16D 65/16* (2013.01); *F16D 65/28* (2013.01); *B60T 2270/402* (2013.01); *F16D 2121/04* (2013.01); *F16D 2125/70* (2013.01)

(56) References Cited

FOREIGN PATENT DOCUMENTS

| | | |
|---|---|---|
| DE | 101 53 849 A1 | 6/2002 |
| DE | 10 2014 200852 A1 | 7/2015 |
| EP | 1 873 029 A1 | 1/2008 |
| EP | 1 873 029 A1 | 2/2008 |
| GB | 2 186 647 A | 8/1987 |
| GB | 2 191 552 A | 12/1987 |
| KR | 1998-046392 | 9/1998 |
| KR | 2003-0018568 | 3/2003 |
| RU | 2 053 149 C1 | 1/1996 |
| RU | 2 161 100 C1 | 12/1999 |
| RU | 2 531 652 | 10/2014 |
| SU | 685534 | 9/1979 |

OTHER PUBLICATIONS

European Search Report for Application No. 17864965.3, dated Feb. 26, 2020.
Legkovye Avtomobily Journal, 5th edition, "The Manual on Training B Category Vehicle Drivers," K.S. Shestopalov, Moscow, 1984, pp. 149-151.

* cited by examiner

VEHICULAR HYDRAULIC BRAKE SYSTEM

CROSS REFERENCE TO RELATED PATENT APPLICATIONS

The present invention is a United States nationalization of PCT/UZ2017/000001, filed Jan. 31, 2017, and claims priority from Uzbekistanian Patent Application No. FAB 2016 0125, filed Oct. 28, 2016, entitled "A VEHICULAR HYDRAULIC BRAKE SYSTEM," the subject matters of which are incorporated by reference herein in their entirety.

TECHNICAL FIELD

The invention relates to transportation vehicle engineering and claimed hydraulic brake system is designed for rapid deceleration of a moving vehicle, enhancing an effectiveness of vehicular braking in emergency situations and increasing a safety of automobile traffic on roads.

BACKGROUND OF THE INVENTION

The prior art generally illustrating a vehicular brake system having a pressure supply source in communication with brake cylinders of service braking, brake pads, emergency brake cylinders in communication with brake pads, wherein said emergency brake cylinders contain a substance with a high thermal expansion coefficient, and have electrical heaters connected to power source by means of control unit with a logic block.

In order to the control brake system conditions and modes of deceleration rate of vehicular wheels, the known brake systems have an indication block having at least four light-emitting diodes or LEDs connected to output leads of the logic block comprising at least four AND circuits, whose output leads are connected to a threshold element and an output lead of a switcher with at least 4 channels. Output leads of said 4-channel switcher are connected correspondingly to emergency brake elements with pressure sensors, while input leads of the 4-channel switcher are connected to a high-frequency generator, an amplifier and a thyristor, such as a power source described in U.S.S.R. Inventor's Certificate No. 1757937, B60T 13/74.

A drawback of the above-said known brake system of the prior art is insufficient reliability arising from a complex configuration of the system, which includes indication blocks and logic blocks, in addition to a need of using in emergency brake cylinders a substance with a high thermal expansion coefficient, and electrical heaters. Such system configurations lay a basis for risk of self-braking, especially when a vehicle is used in a hot climate.

The prior art also shows a vehicular hydraulic brake system having a master brake cylinder with a control pedal, wherein chambers of said master brake cylinder are in communication with two independent circuits of a drive used for driving operating brake cylinders for the front and rear wheels of the vehicle, and the brake system further having an electro-hydraulic signaling apparatus comprised of a housing encasing a piston for switching a signal circuit, each end chamber of the electro-hydraulic signaling apparatus being in communication with a corresponding independent circuit.

The operating brake cylinders of the known hydraulic brake system have emergency switch blocks used for switching the operating brake cylinder from a faulty brake circuit to an operative brake circuit, and are equipped with hydro-pyrotechnic means of emergency drive of operating brake cylinders, should both circuits become inoperable. Each emergency switch block is configured as a hydraulic cylinder having floating pistons, channels communicating end chambers of the hydraulic cylinder and a chamber between the floating pistons with the operating brake cylinder, channels for connecting the end chambers of the hydraulic cylinder to brake circuits closed by a valve mounted on one of the floating pistons, and an electromagnetically driven closing valve electrically connected to corresponding leads of the electro-hydraulic signaling apparatus.

The hydro-pyrotechnic means of emergency drive of operating brake cylinders is configured as a hydraulic cylinder having pyrotechnic cartridges, whose igniting fuse is connected to the switch circuit controlled by brake pedal at a maximal pedal stroke, while a chamber of said hydraulic cylinder is communicated via a non-return valve with a chamber defined between the floating pistons of emergency switch blocks (U.S.S.R. Inventor's Certificate No. 1202930, B60T11/32).

The drawback of the above-said vehicular hydraulic brake system known from the prior art is a complex configuration of the brake system which includes, apart from a master brake cylinder, emergency switch blocks used for switching the operating brake cylinder from a faulty brake circuit to an operative brake circuit, and equipped with hydro-pyrotechnic means of emergency drive of operating brake cylinders, should both circuits become inoperable. In addition, each emergency switch block is configured as a hydraulic cylinder having floating pistons, an electromagnetically driven closing valve, wherein the electromagnetic valve drive is electrically connected to the electro-hydraulic signaling apparatus.

The known hydraulic brake system also includes the aforesaid hydro-pyrotechnic means, which contributes to the complexity of system configuration and adds problems relating to system maintenance, as there is a need for the reloading of pyrotechnic cartridges used. Besides, in the event of a failure of the main or reserve hydraulic pressure drive for any reason (e.g., due to pipeline damage or disintegration), the brake system may become inoperable as a result of insufficiently reliable system configuration.

Technically, a brake system known from the prior art, which is particularly relevant, is a hydraulically-driven brake system (as disclosed in Legkovye Avtomobily Journal, 5$^{th}$ edition revised and extended, ref. "The Manual on Training B Category Vehicle Drivers" by K. S. Shestopalov, Moscow, published by DOSAAF organization, U.S.S.R., 1984, p.p. 149-151). The analogous vehicular hydraulic brake system known from the prior art includes a pedal of an operating brake system, a master brake cylinder, a hydraulic reservoir supplying a brake fluid, a vacuum booster and a pressure regulator present in the hydraulic circuit of rear wheels of the vehicle, pipelines and flexible lines, levers of parking brake system drive, an equalizer, cables, brake pad release levers, braking mechanisms of rear wheels. A hydraulic drive of the operating brake system is arranged to produce a separate action, i.e., such hydraulic drive activated by a common foot pedal acts separately on respective braking mechanisms of the front wheels and the rear wheels of the vehicle.

Providing of separate hydraulic drives ensures vehicle deceleration if a sealing loss occurs in one circuit of hydraulic fluid pipeline (serving either front wheels or rear wheels of the vehicle).

In this known brake system, a foot pedal of service brake is coupled to a pusher disclosed in a piston chamber of a master brake cylinder having a casing with a brake fluid supply reservoir mounted above said casing and arranged in fluid communication with the brake cylinder chamber. Due to a pipeline, said master brake cylinder is in fluid communication with an operating brake cylinder of each wheel of the vehicle. The operating brake cylinder includes pistons arranged capable of interacting with brake pads coupled to each other by a coupling spring. The brake pads are positioned capable of interacting with a brake drum. In order to increase pressure, the system has a vacuum booster and a pressure regulator useful for regulating pressure in hydraulic drive of the rear wheels of the vehicle.

A strong disadvantage of the known hydraulic brake system described above is lesser road-traffic safety since a vehicle may be incapable to stop in emergency situation as said vehicular hydraulic brake system may become inoperable, for example because of a failure which might occur in the master brake cylinder, or in case of brake fluid leakage due to a loss of sealing or physical disintegration or damage of the hydraulic system, or in the event of a damage of the pipes constituting both circuits of the hydraulic drive of the brake system. If this occurs, a driver is unable to stop a moving vehicle and an emergency situation may happen on the road as a result of the foregoing.

OBJECTIVES OF THE INVENTION

An objective of the claimed invention is to enhance road-traffic safety by means of increasing both reliability and effectiveness of decelerating a vehicle in emergency situations.

SUMMARY OF THE INVENTION

The defined objective is gained by providing a vehicular hydraulic brake system comprising a master brake cylinder with a hydraulic reservoir supplying a brake fluid, a control foot pedal and a vacuum booster connected by means of main pipelines to an operating brake cylinder of each wheel, the system further has emergency braking assemblies mounted before the operating brake cylinders of at least rear wheels, said emergency braking assembly comprising an electric mechanism operating in a reciprocating manner and having a rod, said rod is attached to a piston of a hydraulic cylinder having a top portion with an inlet hole and an outlet hole, said inlet hole being connected to the main pipeline and said outlet hole being in communication with the operating brake cylinder, wherein the top portion of the hydraulic cylinder has a compensation port in the close proximity to the electrical mechanism, said compensation port receiving an additional pipeline in communication with the main pipeline.

The defined objective of invention is also gained by that a bottom portion of a casing of the hydraulic cylinder of the emergency braking assembly is disposed not lower than an upper level of the operating braking cylinder.

Providing the hydraulic brake system with emergency braking assemblies activated by pressing a control button of the vehicle dashboard for emergency braking, regardless of operability of the master brake cylinder, integrity and leakproofness of the entire brake system, enables a vehicle driver to effect emergency deceleration of a vehicle in case of both the presence of the brake fluid in the system and lack of it as a result of leakage, or in case of pipeline disintegration or damage. This contributes a lot to vehicle reliability and road traffic safety.

The emergency braking assembly can be mounted both before operating brake cylinders of rear wheels and before operating brake cylinders of all wheels, thus increasing further both reliability and effectiveness of decelerating the vehicle in emergency.

Making inlet and outlet holes in the hydraulic cylinder allows to attach said emergency braking assembly to the pipeline communicating the master brake cylinder with the operating brake cylinders and to brake system of any type, regardless of differences in mechanical parts.

Attachment of the hydraulic cylinder piston to the electric mechanism rod in order to produce brake fluid pressure in the operating brake cylinders in any case enables to enhance reliability and effectiveness of emergency braking.

Providing a compensation port connected to a pipeline in communication with a master brake cylinder enables to avoid a negative pressure in the rod end region of the hydraulic cylinder during its motion. This leads to more reliable operation of emergency braking assembly and the entire brake system.

Making both inlet hole and compensation port in the top portion of the casing of the hydraulic cylinder allows to avoid brake fluid losses, thus making the entire brake system more reliable.

Disposition of the bottom portion of the casing of the hydraulic cylinder not lower than the top level of the operating brake cylinder also enables one to avoid brake fluid losses in case of pipeline disintegration, thus contributing more to the reliability of the entire brake system.

BRIEF DESCRIPTION OF THE DRAWING

While the specification concludes with claims particularly pointing out and distinctly claiming the subject matter that is regarded as forming the present invention, it is believed that the invention will be better understood from the following description taken in conjunction with the accompanying DRAWINGS, where like reference numerals designate like structural and other elements, in which:

DETAILED DESCRIPTION OF THE PRESENT INVENTION

The present invention will now be described more fully hereinafter with reference to the accompanying DRAWINGS, in which preferred embodiments of the invention are shown. It is, of course, understood that this invention may, however, be embodied in many different forms and should not be construed as limited to the embodiments set forth herein; rather, these embodiments are provided so that the disclosure will be thorough and complete, and will fully convey the scope of the invention to those skilled in the art. It is, therefore, to be understood that other embodiments can be utilized and structural changes can be made without departing from the scope of the present invention.

Figure 1:
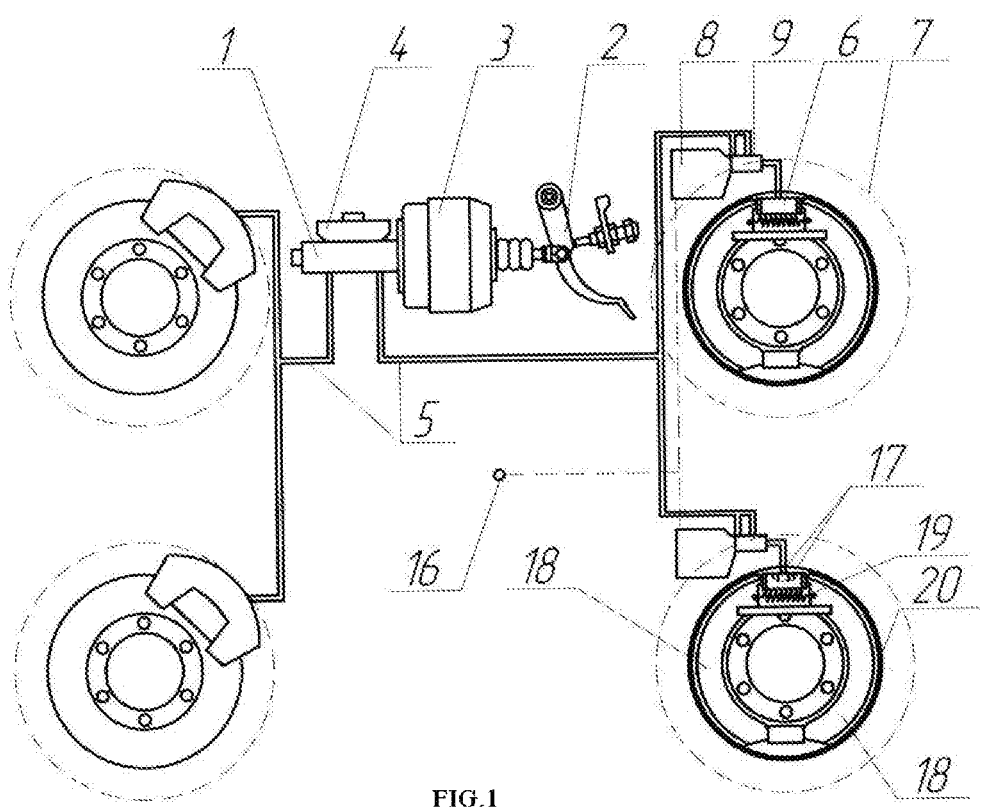
FIG. 1 is a representative schematic view of various operating principles of the claimed brake system according to a first embodiment configuration.

With reference to the DRAWINGS, particularly FIG. 1, a vehicular hydraulic brake system is comprised of a master brake cylinder 1 connected to a spring-assisted footbrake pedal 2 through a vacuum booster 3, wherein a hydraulic reservoir 4 supplying the brake fluid is mounted on said master brake cylinder. The master brake cylinder 1 is configured to be in fluid communication via a pipeline 5 with operating brake cylinder 6 of each wheel 7.

Ahead of said operating brake cylinder 6 of each wheel 7, there is an emergency braking assembly comprising an electrical mechanism 8 designed to operate in a reciprocating manner and a hydraulic cylinder 9. For better effectiveness of braking, said emergency braking assembly can be mounted before said operating brake cylinder 6 of each of the four wheels 7.

Figure 2:
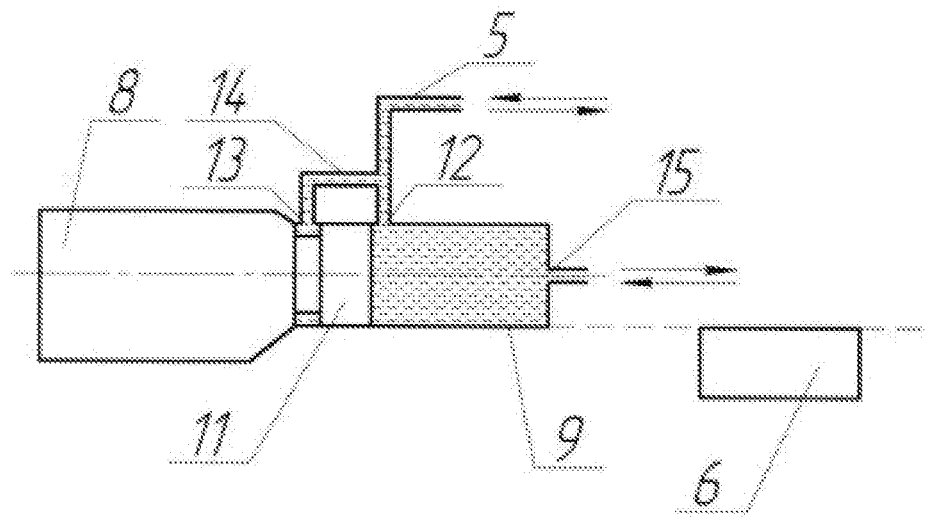
FIG. 2 is a representative schematic view of operating principles of the claimed brake system when the emergency braking assembly is in an idle configuration.
Figure 3:
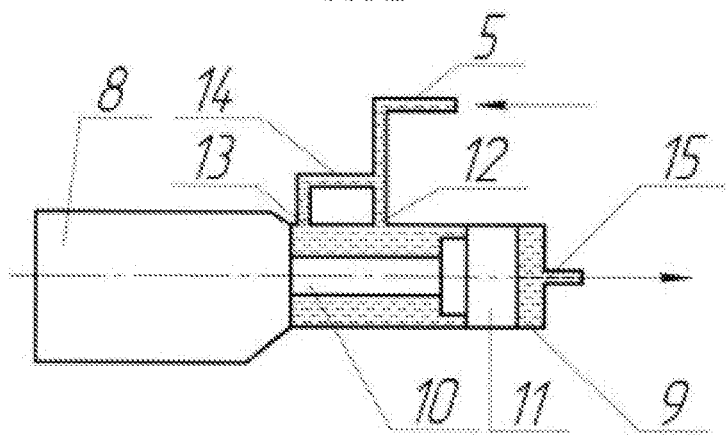
FIG. 3 is a representative schematic view of operating principles of the claimed brake system of an emergency braking assembly under an emergency situation (for example, when there is a failure of a master brake cylinder)

The hydraulic cylinder 9 is in communication with said electric mechanism 8 in a hermetically sealed manner. A rod 10 of electrical mechanism 8, shown in FIG. 3, is attached to a piston 11 of hydraulic cylinder 9, as shown in FIGS. 2 and 3. A top portion of a casing of said hydraulic cylinder 9 has an inlet hole 12 which receives pipeline 5 communicating with master brake cylinder 1, as shown in FIG. 1. The top portion of said casing of the hydraulic cylinder 9 also has a compensation port 13 in communication via an additional pipeline 14 with above-said pipeline 5. The compensation port 13 is made in the casing of the hydraulic cylinder 9 in close proximity to electrical mechanism 8. An end of hydraulic cylinder 9 has an outlet hole 15 which receives the operating hydraulic cylinder 6 of each rear wheel 7.

As shown in FIG. 2, a bottom portion of the casing of hydraulic cylinder 9 of said emergency braking assembly is disposed not lower than an upper level of the aforesaid operating cylinder 6.

It should be understood that a dashboard of the vehicle has a press button 16 to control the emergency braking assembly, as generally indicated in FIG. 1.

With reference to FIG. 1, the operating brake cylinder 6 of each wheel 7 comprises pistons 17 mounted and capable of interacting with brake pads 18 coupled with each other by a coupling spring 19. The brake pads 18 so positioned are capable of interacting with a brake drum 20 of each wheel 7.

Pipelines 5, chambers of master brake cylinder 1, hydraulic cylinder 9 and all operating cylinders 6 contain a brake fluid coming from a hydraulic reservoir 4 to supply the brake fluid.

A vehicular hydraulic brake system operates in the following manner.

During braking, when a driver puts a pressure upon a pedal 2 via a master cylinder 1, said brake fluid is displaced to pipelines 5 and an operating cylinder 6 of each wheel 7, as illustrated in FIG. 1. The operating brake cylinder 6 of each rear wheel 7 receives the brake fluid coming from the pipelines 5 through the aforementioned holes 12 and 15 of the hydraulic cylinder 9, as shown, for example, in FIG. 2. Under idle conditions, a piston 11 within hydraulic cylinder 9 is disposed in close proximity to electrical mechanism 8. A chamber of the hydraulic cylinder 9 contains the brake fluid filling a rod end region which flows along the aforesaid additional pipeline 14.

Being contained within the operating brake cylinder 6 of each wheel, the brake fluid causes the pistons 17 to move and, as a result of such motion, brake pads 18 are forced against the brake drum 20. When a gap between the brake pads 18 and the brake drums 20 disappears, a displacement of brake fluid from the master brake cylinder 1 to the operating brake cylinder 6 becomes impossible. Further increases in pressing force applied to pedal a 2 results in greater pressure of the brake fluid in the brake system, activating thereby a simultaneous braking of all wheels 7.

The greater a force is applied to pedal a 2, the more pressure is then produced by the master brake cylinder 1 to act upon the fluid, and this greater force acts through pistons 17 of each operating brake cylinder 6 upon the respective brake pads 18.

When the pressure upon the pedal 2 is interrupted, all said members return to their original positions, and the compressed coupling springs 19 retract the brake pads 18 from the brake drums 20. The pistons 17 of operating brake cylinders 6 approach each other to displace the brake fluid from each brake cylinder 6 to the master brake cylinder 1.

Figure 4:
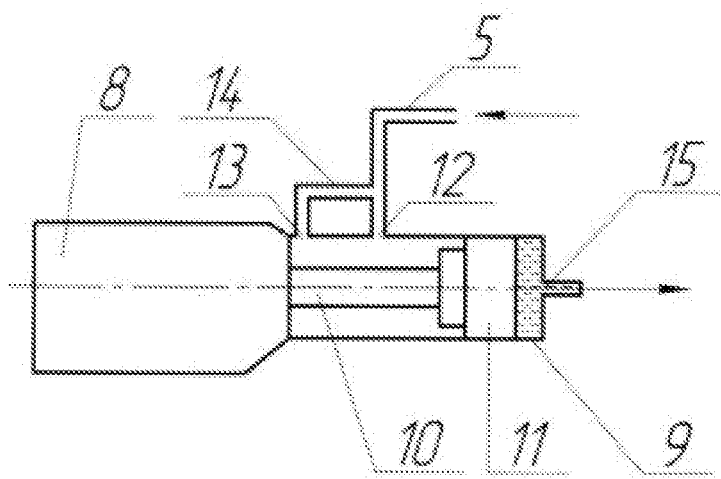
FIG. 4 is a representative schematic view of operating principles of the claimed brake system of an emergency braking assembly in operational condition in case of damage of hydraulic drive pipes and a full loss of brake fluid in the system.

In emergency situations, for example, when the main brakes of the vehicle fail as a result of a breakdown of master brake cylinder 1, as shown in FIG. 3, or in the case of brake fluid leakage because of the aforementioned hydraulic brake system becomes unsealed or as a result of a damage to a pipeline 5, as shown in FIG. 4, there is thus no pressure in the brake cylinders 6 and no braking can be done. In this particular case, a driver activates the aforedescribed electric mechanism 8 by pressing a control button 16. A rod 10 of said electrical mechanism 8 then sets a piston 11 of a hydraulic cylinder 9 in motion. While, during such motion, said piston 11 of the hydraulic cylinder 9 covers inlet hole 12, the above-said brake fluid (or air) coming from pipeline 5 through the additional pipeline 14 via the compensation port 13 arrives to a rod end of the hydraulic cylinder 9, preventing thereby the vacuum production in a chamber of the hydraulic cylinder 9 between the electric mechanism 8 and piston 11. The brake fluid remaining in hydraulic cylinder 9 comes under the pressure of piston 11 through an outlet hole 15 into the operating brake cylinder 6.

Being contained within the operating brake cylinder 6 of each wheel 7, the brake fluid causes the pistons 17 to move and, as a result of such motion, the brake pads 18 are forced against the brake drum 20, and emergency braking occurs for this particular reason.

The suggested vehicular hydraulic brake system set forth herein is useful for mounting on automobiles either equipped with ABS systems or free of such ABS systems. The suggested system is also fully fit to replace electrically-driven stopping (parking) brake or hand brake.

The suggested vehicular hydraulic brake system is applicable to any vehicles equipped with a hydraulic braking system, no matter which type of brakes (disk or drum type brakes) is available on a vehicle. In addition, the claimed brake system enables the installation of emergency brake assemblies on those vehicles currently in operation, while stationed in auto repair shop, without having to add any modifications to automobile design. The suggested structure of the brake system is capable of decelerating a vehicle in any emergency situation caused by a malfunction of the main brakes, including a loss of brake fluid in hydraulic circuit, and it also enables to avoid emergency situations on roads, thus contributing a lot to road-traffic safety.

The previous descriptions are of preferred embodiments for implementing the invention, and the scope of the invention should not necessarily be limited by these descriptions. It should be understood that all articles, references and citations recited herein are expressly incorporated by reference in their entirety. The scope of the current invention is defined by the following claims.

What is claimed is:

1. A vehicular hydraulic brake system comprising:
a master brake cylinder with a hydraulic reservoir supplying a brake fluid to a main pipeline,
a control foot pedal and a vacuum booster connected to said main pipeline and to respective operating brake cylinders of rear wheels of a vehicle,
wherein said vehicular hydraulic brake system further comprises:
a plurality of emergency braking assemblies each mounted before respective operating brake cylinders of said rear wheels of said vehicle,
wherein each said emergency braking assembly comprises an electrical mechanism attached to a rod, respective rods operating in a reciprocating manner,
wherein each said rod, attached at one end to respective electrical mechanisms, is attached at the other end to a respective piston within a respective hydraulic cylinder,
wherein each said hydraulic cylinder, attached at one end to said respective electrical mechanisms, has a top portion thereof adjacent said electrical mechanism with an inlet hole therethrough, said inlet hole being adjacent said electrical mechanism and being connected to the main pipeline,
wherein each said hydraulic cylinder also has an outlet hole, said outlet hole being disposed at the other end of said hydraulic cylinder and being in communication with a respective operating brake cylinder, and
wherein the top portion of each said hydraulic cylinder has a compensation port therethrough, said compensation port disposed between the electrical mechanism and the input port, said compensation port in communication with the main pipeline; and
an activation button, said activation button, when pressed by a driver, activates said emergency braking assemblies within said vehicular hydraulic brake system,
whereby, in an emergency circumstance, said emergency braking assemblies within said vehicular hydraulic brake system stops said vehicle by the respective electrical mechanisms driving the respective rods outwards along with the respective pistons, respective pistons closing off respective inlet holes from respective operating brake cylinders, thereby allowing said driver to brake using the remaining brake fluid in the operating brake cylinders.

2. The vehicular hydraulic brake system according to claim 1, wherein:
a bottom portion of a casing of the respective hydraulic cylinders of the emergency braking assembly is disposed not lower than an upper level of the operating braking cylinders.

3. The vehicular hydraulic brake system of claim 1, further comprising:
a pipeline within each said emergency braking assembly, each said respective pipeline connecting said compensation port to a second pipeline connecting to said input port.

4. The vehicular hydraulic brake system of claim 1, wherein said plurality of emergency braking assemblies further comprises respective emergency braking assemblies mounted before the operating brake cylinders of front wheels of said vehicle.

5. A vehicular hydraulic brake system comprising:
a master brake cylinder in communication with a hydraulic reservoir supplying a brake fluid and a vacuum booster,
wherein said master brake cylinder is connected to a spring-assisted footbrake pedal through said vacuum booster, and
wherein said master brake cylinder is also in fluid communication with respective operating brake cylinders for each rear vehicle wheel;
a plurality of emergency braking assemblies, respective emergency braking assemblies being mounted before respective operating brake cylinders of said each rear vehicle wheel, and adjacent thereto,
wherein each said emergency braking assembly comprises an electrical mechanism attached to a first end of a rod, said rod attached at a second end thereof to a piston within a hydraulic cylinder, and
wherein each said hydraulic cylinder is hermetically sealed and attached at one end to and in communication with a respective electrical mechanism, with respective rods and pistons operating in a reciprocating manner within each said hydraulic cylinder;
a top portion of a casing of each said hydraulic cylinder adjacent said respective electrical mechanism has an inlet hole, said inlet hole being connected to a main pipeline in communication with the master brake cylinder;
wherein each said hydraulic cylinder has a compensation port, each said compensation port disposed at said top portion between said electrical mechanism and said inlet hole;
an outlet hole is made in the casing of the hydraulic cylinder, disposed at the other end thereof, said outlet hole being below said top portion, said outlet hole being connected to the operating brake cylinder of said rear wheels; and
a control button, said control button controlling said plurality of emergency braking assemblies.

6. The vehicular hydraulic brake system according to claim 5, wherein the respective pistons of the respective hydraulic cylinders are positioned, in idle mode, before the inlet hole adjacent to the electrical mechanism operating in a reciprocating manner,
wherein the respective pistons of the respective hydraulic cylinders, in operating mode, cover the inlet hole to produce pressure within the respective operating brake cylinder, and
wherein the main pipeline, chambers of the master cylinder, the hydraulic cylinders and the respective operating cylinders contain brake fluid coming from a hydraulic reservoir.

7. The vehicular hydraulic brake system according to claim 5, wherein a bottom portion of a casing of the respective hydraulic cylinders of the emergency braking assemblies is disposed not lower than an upper level of the operating braking cylinders.

8. The vehicular hydraulic brake system according to claim 5, further comprising:
respective emergency braking assemblies mounted before respective operating brake cylinders of front vehicle wheels of a vehicle.

9. The vehicular hydraulic brake system according to claim 5, wherein the casing of each of the respective hydraulic cylinders of the respective emergency braking assemblies is attached to the respective operating brake cylinders of each of the rear vehicle wheels, and the respective hydraulic cylinders being hermetically sealed.

10. A vehicular brake emergency assembly comprising:

a hydraulic cylinder;

an electrical mechanism connected at one end of said hydraulic cylinder;

a rod, said rod attached at one end to said electrical mechanism and extending within said hydraulic cylinder;

a piston, said piston attached at one end to the other end of said rod and within said hydraulic cylinder, said rod and said piston, powered by said electrical mechanism, operating in a reciprocal manner within said hydraulic cylinder, wherein said hydraulic cylinder has a top portion thereof adjacent said electrical mechanism with an inlet hole therethrough, said inlet hole being adjacent said electrical mechanism and being connected to a main pipeline, wherein said hydraulic cylinder has an outlet hole, said outlet hole being disposed at the other end of said hydraulic cylinder and being in communication with an operating brake cylinder for a wheel, and wherein the top portion of said hydraulic cylinder has a compensation port therethrough, said compensation port disposed between the electrical mechanism and the input port, said compensation port in communication with the main pipeline; and an activation button, said activation button, when activated, activates said vehicular brake emergency assembly, whereby, in an emergency circumstance, said vehicular brake emergency assembly stops said wheel by the electrical mechanism driving the rod outwards along with the piston, said piston closing off said inlet hole from the operating brake cylinder, thereby allowing braking using the remaining brake fluid within the operating brake cylinder.

11. The vehicular brake emergency assembly according to claim 10, wherein:

a bottom portion of a casing of said hydraulic cylinder is disposed not lower than an upper level of the operating braking cylinder.

12. The vehicular brake emergency assembly according to claim 10, further comprising:

a pipeline said pipeline connecting said compensation port to a second pipeline connecting to said input port.

13. The vehicular brake emergency assembly according to claim 10, wherein said wheel comprises at least one rear wheel of a vehicle, and said emergency braking assembly is mounted before the operating brake cylinders of said at least one rear wheel.

14. The vehicular brake emergency assembly according to claim 13, wherein said wheel comprises at least one front wheel of a vehicle, and said emergency braking assembly is mounted before the operating brake cylinders of said at least one front wheel.

\* \* \* \* \*